UNITED STATES PATENT OFFICE.

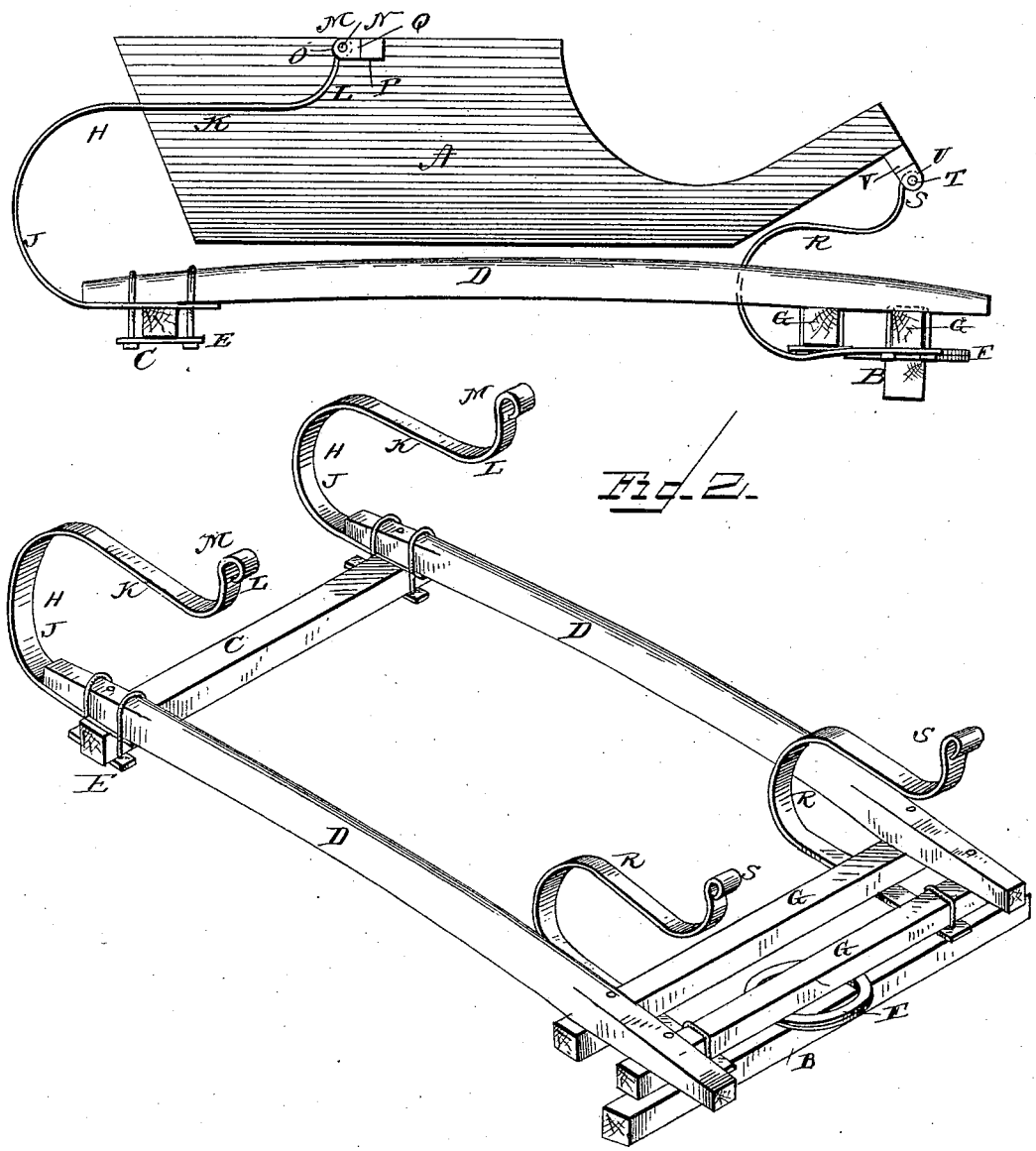

DAVID SPENCER ANDERSON, OF McGRAWVILLE, NEW YORK, ASSIGNOR OF ONE-HALF TO CHARLES M. BEAN, OF SAME PLACE.

RUNNING-GEAR FOR VEHICLES.

SPECIFICATION forming part of Letters Patent No. 346,700, dated August 3, 1886.

Application filed March 15, 1886. Serial No. 195,198. (No model.)

*To all whom it may concern:*

Be it known that I, DAVID SPENCER ANDERSON, a citizen of the United States, and a resident of McGrawville, in the county of Cortland and State of New York, have invented certain new and useful Improvements in Running-Gear for Vehicles; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of as much of a vehicle as will illustrate my invention, and Fig. 2 is a perspective view of the running-gear removed from the body of the vehicle.

Similar letters of reference indicate corresponding parts in both the figures.

My invention has relation to springs for vehicles; and it consists in the improved construction and combination of parts of a vehicle having springs secured to the running-gear and curved rearward, and thereupon upward and forward, ending in upwardly-projecting portions, to which the body is attached, as hereinafter more fully described and claimed.

In the accompanying drawings, the letter A indicates the body of the vehicle, which body may be of any desirable construction, and B and C are respectively the front and rear axles.

The side bars, D D, are secured near their rear ends to the rear axle by means of suitable clips, E, and at the forward ends the bars are connected by means of cross-pieces G G, to which the upper portion of the fifth-wheel F is secured, the remainder of the fifth-wheel being secured to the front axle. The rear springs, H H, are secured at their lower ends by means of clips E, between the rear ends of the side bars and the rear axle, although they may be either secured to the upper sides of the rear ends of the side bars, or they may be secured to the under side of the axle; and these springs are formed with rearwardly-curving portions J, whereupon the upper portions are first curved forward, as shown at K, and thereupon bent upward, as shown at L. The upper ends of the springs are formed with transverse eyes M, through which eyes pass bolts N, which are secured at their ends in perforated lips O from shackles P, which project from brackets Q upon the sides of the vehicle-body, the said brackets projecting from the points to the rear of the seat, if the vehicle is only provided with one seat, while if the vehicle is provided with more than one seat the brackets project from points slightly to the rear of the point at which the weight of the load is centered. The front springs, R R, are shaped similarly to the rear springs, but are somewhat smaller and have their lower ends secured under the cross-pieces connecting the side bars. The upper eyed ends, S, of these springs are pivoted upon bolts T, passing through the perforated lips of shackles U, projecting from brackets V at the forward end of the vehicle-body, and it will thus be seen that the body is suspended from the eyed upwardly-projecting ends of the springs. When the body is depressed by the load, the springs will force the body slightly forward, and the springs being long and flexible they will afford an easily-yielding support, changing any rolling motion into a longitudinal motion, which will be a more agreeable and easy motion to the passenger or passengers in the vehicle than the laterally-rolling motion. The weight of the rear portion of the vehicle-body will fall upon the rear axle, and the weight of the forward portion of the body will fall upon the cross-pieces, which will transfer the weight to the front axle, so that the side bars will only have to connect the forward and rear portions of the running-gear without supporting any of the weight of the body.

I am aware that it is not broadly new to support bodies of vehicles from the ends of curved or S-shaped springs; but I am not aware that such springs have been arranged and attached in the manner herein described.

I therefore claim and desire to secure by Letters Patent of the United States—

1. The combination of the body of a vehicle, the side bars secured to the rear axle and having their forward ends connected by cross-pieces connected to the forward axle, and springs consisting of rearwardly-curved portions and of upwardly-curved eyed portions having their forward lower ends secured, respectively, to the rear axle or rear ends of the side bars and to the cross-pieces connecting the said bars, and having their upwardly-projecting upper ends, respectively, secured to shackles projecting from the sides of the body to the rear of the center of the load and to the forward end of the body, as and for the purpose shown and set forth.

2. The combination of the body of a vehicle, side bars secured at their rear ends to the rear axle, and connected at their forward ends by cross-pieces connected to the front axle, rear springs consisting of rearwardly-curved portions and upwardly-projecting eyed upper ends, and secured at the lower ends to the rear ends of the side bars between the said ends and the rear axle, and secured at the upper ends to shackles projecting laterally from the sides of the body to the rear of the center of the load, and forward springs consisting of rearwardly-curved portions and upwardly-projecting eyed ends secured at the lower ends to the cross-pieces and at their upper ends to shackles projecting from the forward end of the body, as and for the purpose shown and set forth.

In testimony that I claim the foregoing as my own I have hereunto affixed my signature in presence of two witnesses.

DAVID SPENCER ANDERSON.

Witnesses:
   HIRAM D. CARY,
   SAMUEL D. TAYLOR.